United States Patent
Svec et al.

(10) Patent No.: US 7,685,406 B2
(45) Date of Patent: Mar. 23, 2010

(54) DETERMINATION OF CURRENT STACK POINTER VALUE USING ARCHITECTURAL AND SPECULATIVE STACK POINTER DELTA VALUES

(75) Inventors: Christopher Svec, Austin, TX (US); Faisal Syed, Austin, TX (US); Michael E. Tuuk, Austin, TX (US); Benjamin T. Sander, Austin, TX (US); Gregory W. Smaus, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 243 days.

(21) Appl. No.: 11/690,029

(22) Filed: Mar. 22, 2007

(65) Prior Publication Data
US 2008/0235491 A1 Sep. 25, 2008

(51) Int. Cl.
*G06F 12/06* (2006.01)
(52) U.S. Cl. ........................................ 712/202; 711/220
(58) Field of Classification Search ........................ None
See application file for complete search history.

(56) References Cited

U.S. PATENT DOCUMENTS 5,142,635 A * 8/1992 Saini .......................... 712/225
7,017,026 B2 * 3/2006 Yoaz et al. .................. 711/213
7,089,400 B1 * 8/2006 Pickett et al. ............... 711/217

OTHER PUBLICATIONS

"Early Load Address Resolution Via Register Tracking," Michael Bekerman et al., Intel Corporation, ACM 2000, Vancouver, BC, Canada, pp. 306-315.
"Intel Technology Journal," Simcha Gochman et al., Intel Corporation, vol. 7, Issue 2, May 21, 2003, pp. 21-37.

* cited by examiner

*Primary Examiner*—Kenneth S Kim

(57) ABSTRACT

A technique for reducing stack pointer adjustment operations when stack dependent operations, which correspond to stack dependent instructions, are encountered includes setting a stack pointer to an initial value for a stack. A number of bytes associated with the stack dependent operation is determined. A stack pointer delta is then modified based upon the number of bytes associated with the stack dependent operation. A current location in the stack is determined based on the stack pointer and the stack pointer delta.

20 Claims, 3 Drawing Sheets

DETERMINATION OF CURRENT STACK POINTER VALUE USING ARCHITECTURAL AND SPECULATIVE STACK POINTER DELTA VALUES

BACKGROUND

1. Field of the Disclosure

The present disclosure is generally directed to a stack and, more particularly, techniques for maintaining a stack pointer for a stack.

2. Description of the Related Art

As is well known, a stack is an area of memory that is utilized to store information. Typically, computer systems have employed a stack to hold information in order to switch context to a called function and restore a calling function when the called function completed. In general, such computer systems follow a run-time protocol between calling and called functions to save arguments and return values on the stack. Stacks may be used to support nested or recursive function calls and, in this case, a stack may be used implicitly by a compiler to support various statements, e.g., call and return statements. Some programming languages use a stack to store data that is local to a procedure. In this case, space for local data items is allocated in the stack when the procedure is entered and is deallocated when the procedure is exited. A stack pointer, e.g., a stack pointer register, holds an address that points to the most recently referenced location on the stack. The two instructions that are generally applicable to all stacks are a push and a pop (or pull). A push is used to place information at a location pointed to by the stack pointer after the address in the stack pointer is adjusted by the size of the information. A pop is used to remove information at the current location pointed to by the stack pointer. The stack pointer is then adjusted by the size of the information removed.

In general, each stack has a fixed location in memory at which it begins. As data items are added to the stack, the stack pointer is displaced to indicate the current extent of the stack, which expands away from the origin (e.g., up or down, depending on the specific implementation). For example, a stack might start at a memory location of one-thousand, and expand towards lower addresses, in which case new data items are stored at locations ranging below one thousand, and the stack pointer is decremented each time a new data item is added. In this case, when a data item is removed from the stack, the stack pointer is incremented. Stack pointers may point to the origin of a stack or to a limited range of addresses either above or below the origin (depending on the direction in which the stack grows). In general, a stack pointer should not cross an origin or an end-point of the stack. For example, if the origin of the stack is at address one-thousand and the stack grows downwards (towards addresses nine-hundred ninety-nine, etc.), the stack pointer should not be incremented above one-thousand, as doing so may corrupt data associated with another application.

Traditionally, modification of a stack pointer has been achieved by providing a side-effect operation (i.e., an operation that incremented or decremented a stack pointer register) for each stack related operation. The side-effect operation added/subtracted an immediate value (based on the instruction set architecture (ISA)) to/from a stack pointer value stored in a stack pointer register. Other processor architectures have employed dedicated stack engine hardware that added/subtracted a value of a delta stack pointer to/from a value of an historic stack pointer to provide a current stack pointer value for a single ISA, e.g., an x86 ISA. The stack engine hardware then patched the delta stack pointer value into an address syllable of each stack referencing operation to allow an address generation unit (AGU) to calculate a memory location for the current stack pointer value. Using this approach, dependencies on the stack pointer register were avoided, as the value held by the stack pointer register was not normally modified during a sequence of stack operations. In this approach, updates of the delta stack pointer value were performed by a dedicated adder/subtractor. According to this approach, recovery information (that included the delta stack pointer value and code related to the stack pointer register) was saved in a table for each instruction in the event that a pipeline flush operation was required. In this architecture, when a value of the stack pointer register was required in an address syllable for a load or store instruction, a decoder automatically inserted an operation (i.e., a synchronization operation) that updated the value in the stack pointer register (i.e., added/subtracted the delta stack pointer value to/from the value in the stack pointer register). The delta stack pointer was then cleared.

What is needed is a technique for maintaining a stack pointer that improves upon known approaches.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
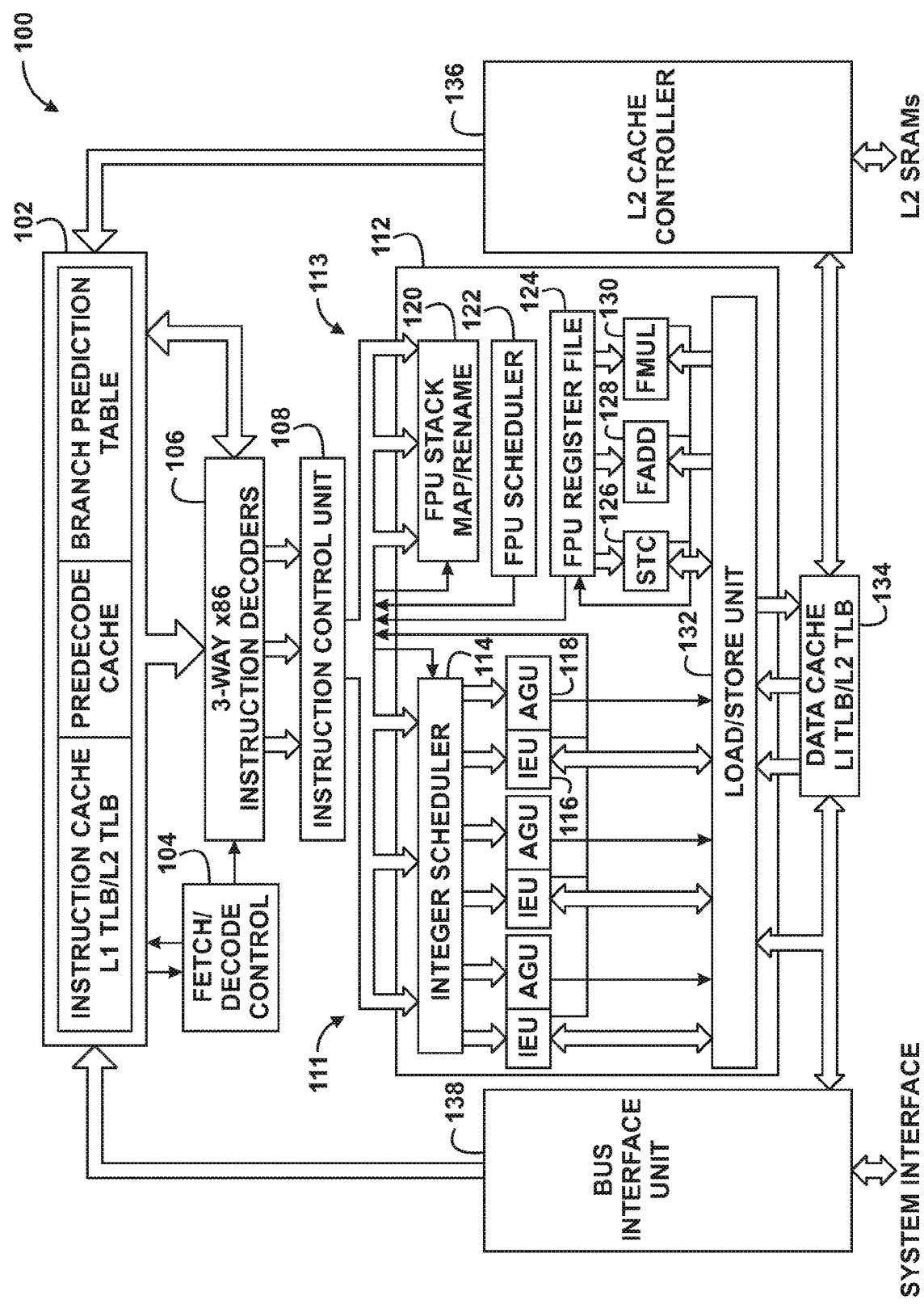
FIG. 1 is an electrical block diagram of a relevant portion of a processor that is configured according to an embodiment of the present disclosure.

According to various aspects of the present disclosure, a sideband stack optimizer (SSO) is employed to reduce stack pointer adjustment operations when stack dependent operations, which correspond to stack dependent instructions, are encountered. The SSO may be implemented within, for example, an instruction control unit (ICU). In general, the sideband stack optimizer employs a stack pointer delta (SPD) register, e.g., a 10-bit register, that maintains a speculative value of a SPD. The speculative SPD value is combined with a stack pointer value maintained in a stack pointer register, e.g., a 64-bit register, to provide a current stack pointer value. When a stack dependent instruction, e.g., a push, pop, call, or return instruction, is indicated by a decoder, the speculative SPD value is modified according to a byte size of the stack dependent instruction. For example, when a 32-bit instruction is indicated, the speculative SPD value is incremented or decremented by four. As another example, when a 64-bit instruction is indicated, the speculative SPD value is incremented or decremented by eight. In general, a displacement of loads and stores that are stack dependent is adjusted by first modifying the speculative SPD value and then adding the new SPD value to the stack pointer register value. In at least one embodiment, a decoder decodes a 16-bit stack dependent instruction into two operations, i.e., an instruction dependent operation and a stack pointer adjustment operation. In general, removing a dependency of an operation on a stack pointer value stored in a stack pointer register improves latency, reduces power consumption, and increases performance of a related processor, as the processor is not required to serially access a stack pointer register for each stack dependent instruction.

The SPD register, which maintains a current speculative SPD value, may be implemented within the SSO in conjunction with a re-order buffer (ROB). A relatively small and fast adder/subtractor may also be implemented in conjunction with the SPD register to update the speculative SPD value maintained by the SPD register. When a stack dependent operation enters the SSO, the stack pointer value maintained in the stack pointer register and a speculative SPD value maintained by the stack pointer delta register may be provided as operands for the operation. That is, during processor operation when a stack dependent operation enters the sideband stack optimizer of the processor, the SPD value is updated so that subsequent operations can immediately determine a new value of the stack pointer. In this case, the stack pointer register does not require writing of a new value into the stack pointer register for each stack dependent operation and, as such, subsequent stack dependent operations are not delayed by a write to the stack pointer register by a current stack dependent operation.

In general, the SSO may be configured to facilitate maintenance of speculative and architectural copies of the SPD value in order to handle pipeline aborts (including branch mispredicts). When a pipeline abort occurs, the architectural copy of the SPD value is written to the speculative copy of the SPD value. Following flushing of the pipeline, no new instructions enter the ROB until all operations that occurred before the pipeline abort are flushed from the ROB. Using this approach, a hardware table for maintaining an array of checkpointed SPD information for recovery is not required. In operation, the speculative SPD copy is updated when stack dependent operations issue into the ROB and the architectural SPD copy is updated upon retirement of the stack dependent operations. Fix-up (or synchronization) operations may be employed to update a stack pointer value maintained in the stack pointer register under limited circumstances. A fix-up operation combines the current value of the stack pointer, e.g., held in a stack pointer register, and the current value of the stack pointer delta (SPD), e.g., held in a SPD register, and then stores the combined value in the stack pointer register, and then clears the SPD register.

According to one aspect of the present disclosure, a technique for reducing stack pointer adjustment operations when stack dependent operations, which correspond to stack dependent instructions, are encountered includes setting a stack pointer to an initial value for a stack. According to the technique, a number of bytes associated with a stack dependent operation is determined. A stack pointer delta is then modified based upon the number of bytes associated with the stack dependent operation. A current location in the stack is then determined based on the stack pointer and the stack pointer delta.

According to another embodiment of the present disclosure, a processor includes a decoder and a sideband stack optimizer (SSO). The decoder is configured to decode stack dependent instructions to respective stack dependent operations and is further configured to provide a first indicator that indicates a number of bytes associated with at least some of the stack dependent operations. The SSO is coupled to the decoder and includes a stack pointer delta register and logic.

The stack pointer delta register is configured to store a stack pointer delta. The logic is configured to update the stack pointer delta based on the first indicator. The stack pointer delta is combined with a stack pointer stored in a stack pointer register to provide a current stack pointer.

According to another aspect of the present disclosure, a system includes a processor and a memory subsystem coupled to the processor. The processor includes a decoder and sideband stack optimizer (SSO) that includes a stack pointer delta register and logic. The decoder is configured to decode stack dependent instructions to respective stack dependent operations and is further configured to provide an indicator that indicates a number of bytes associated with at least some of the stack dependent operations. The SSO is coupled to the decoder and the stack pointer delta register is configured to store a stack pointer delta. The logic is configured to update the stack pointer delta based on the indicator. The stack pointer delta is added to a stack pointer stored in a stack pointer register to provide a current stack pointer. A portion of the memory subsystem is configured to provide a stack.

With reference to FIG. 1, a relevant portion of a processor 100 that includes a sideband stack optimizer (not specifically shown in FIG. 1) is illustrated. The processor 100 includes a cache memory (cache) 102 that functions as an instruction cache. In one or more embodiments, the cache 102 incorporates a level 1 (L1) translation look-aside buffer (TLB), a level 2 (L2) TLB, a predecode cache, and a branch prediction table. The cache 102 is coupled to a bus interface unit (BIU) 138 and an L2 cache controller 136. A fetch/decode control unit 104 is coupled to the cache 102 and instruction decoders 106. The fetch/decode control unit 104 controls instruction fetching from the cache 102 and controls instruction decoding by the instruction decoders 106. Decoded instructions (operations) are provided from the instruction decoders 106 to an instruction control unit (ICU) 108, which, among other functions, determines whether a decoded instruction (operation) should be dispatched to an integer unit 111 or a floating point unit (FPU) 113 of an out-of-order execution unit 112. The decoders 106 provide a size indicator that indicates a size (e.g., 4-bytes, 8-bytes, etc.) of an operation for at least some instructions. The decoders 106 also provide an operation indicator, for at least some instructions, that indicates whether the size indicator should be added to or subtracted from a current value of a stack pointer delta (SPD). In at least one embodiment, the sideband stack optimizer is included within the ICU 108. It should, however, be appreciated that the sideband stack optimizer may be included within other functional blocks and may include more or less functional blocks than those shown in FIG. 2

The integer unit 111 includes an integer scheduler 114, which is coupled to a plurality of integer execution units (IEUs) 116, which execute integer operations, and a plurality of address generation units (AGUs) 1118, which generate addresses for integer operations. The IEUs 116 and the AGUs 118 are also coupled to a load/store (LS) unit 132, which is coupled to a cache 134. The cache 134 functions as a data cache and may implement an L1 TLB and an L2 TLB. The cache 134 is coupled to the BIU 138 and the L2 cache controller 136. The FPU 113 includes an FPU stack map/rename unit 120, an FPU scheduler 122, and an FPU register file 124. In the illustrated embodiment, the FPU register file 124 is coupled to three logical pipes, i.e., a store control (STC) pipe 126, a floating point addition (FADD) pipe 128, and a floating point multiplication (FMUL) pipe 130, each of which may include one or more execution units that have multiple stages. The three logical pipes are also coupled to the LS unit 132.

Figure 2:
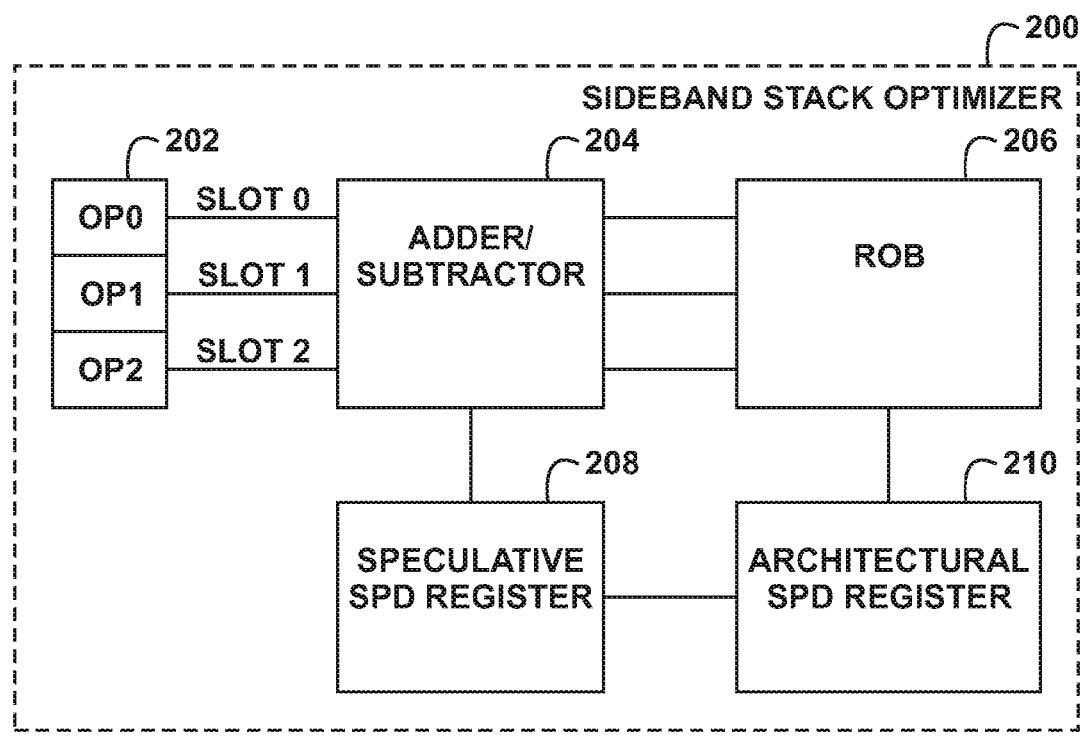
FIG. 2 is an electrical block diagram of a relevant portion of a sideband stack optimizer (SSO) of the processor of FIG. 1

With reference to FIG. 2, a sideband stack optimizer (SSO) 200 is illustrated that may be incorporated within the ICU 108. Alternatively, the SSO 200 may be incorporated within a different functional block between the decoders 106 and the out-of-order execution unit 112. As is illustrated, the SSO 200 includes an operation queue 202 that stores operations provided from the instruction decoders 106. While the illustrated embodiment includes three decoders and three operations queues for slots 0, 1, and 2, it should be appreciated that the techniques disclosed herein are broadly applicable to a processor including more or less than three slots. An adder/subtractor 204 is coupled between the operation queue 202 and a re-order buffer (ROB) 206. As is typical the ROB 206 stores operations and operands for the stored operations.

The adder/subtractor 204 is coupled to a speculative stack pointer delta (SPD) register 208 and modifies a speculative SPD value, maintained in the SPD register 208, by an operation dependent value that is based upon a size indicator included with a received operation. In various embodiments, at least some operations include an operation indicator that indicates whether to add or subtract an operation associated value from the speculative SPD value. For example, if a 4-byte (32-bit) operation is indicated, the speculative SPD value will be incremented or decremented by four. Similarly, if an 8-byte (64-bit) operation is indicated, the speculative SPD value will be incremented or decremented by eight. The operation and its associated operands are then stored within the ROB 206. An architectural SPD register 210 maintains an architectural SPD value such that in the event of a pipeline flush, the architectural SPD value in the architectural SPD register 210 may be copied into the speculative SPD register 208. As noted above, this allows for information recovery without maintaining a hardware table that stores an array of check-pointed SPD information.

Figure 3:
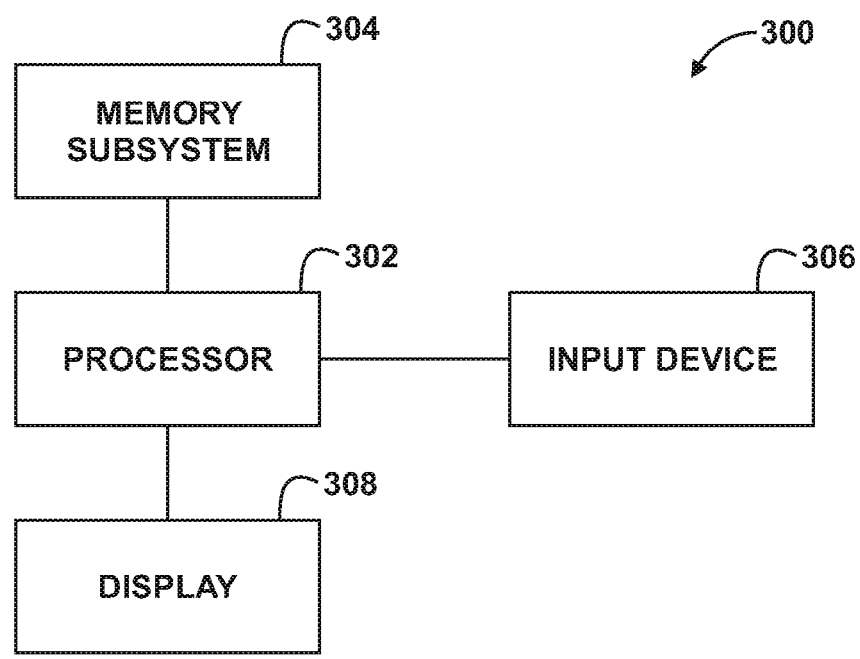
FIG. 3 is an electrical block diagram of a relevant portion of a computer system that includes one or more processors configured according to FIGS. 1 and 2.

Moving to FIG. 3, a computer system 300 is illustrated that includes a processor 302 that may include one or more processors configured in accordance with the processor 100 shown in FIGS. 1 and 2. The processor 302 is coupled to a memory subsystem 304, which includes an application appropriate amount of volatile and non-volatile memory. The processor is also coupled to an input device 302, e.g., a mouse, keyboard, etc., and a display, e.g., a liquid crystal display (LCD).

Figure 4:
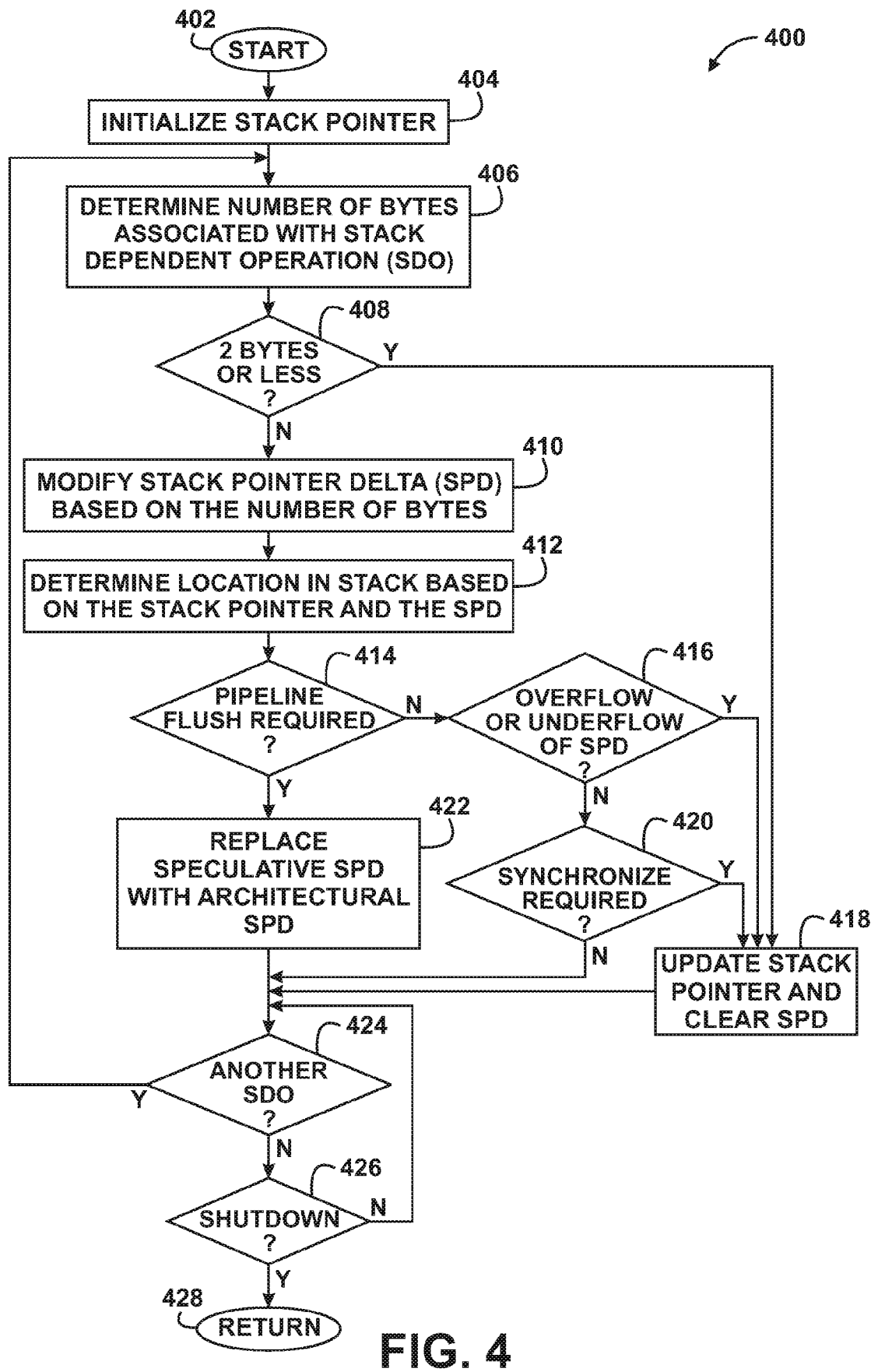
FIG. 4 is a flow chart of a process for maintaining a current stack pointer location, according to an embodiment of the present disclosure.

Turning to FIG. 4, a process 400 is illustrated that maintains a stack pointer location during operation of the processor 100. The process 400 may be implemented in hardware, software, or a combination thereof. At block 402, the process 400 is initiated at which point control transfers to block 404, where a stack pointer (e.g., maintained in a stack pointer register) is initialized to point to a beginning of a stack in memory. Next, in block 406, the decoders 106 determine the number of bytes associated with a stack dependent operation (SDO), i.e., an operation that uses the stack, and (depending on the SDO) provides a size indicator for the SDO that the adder/subtractor 204 may utilize when modifying a stack pointers delta (SPD) that is maintained in the speculative SPD register 208. Then, in decision block 408, it is determined whether the number of bytes associated with the SDO is 2-bytes (16-bits) or less. If so, the SPD is not utilized and the stack pointer is updated directly (with the sum of the current value of the stack pointer and the current value of the speculative SPD in block 418. Also, in block 418, the SPD is cleared. Alternatively, the SPD may be cleared (zeroed) only if the SPD is not already zero. It should be appreciated that the process 400 may be modified such that SDOs having 2-bytes or less may utilize the SDO.

Following block 418, control transfers to decision block 424 where it is determined whether another SDO has been received. If another SDO has been received in block 424, control transfers to block 406. If another SDO has not been received in block 424 control transfers to decision block 426, where it is determined whether shut-down of the processor 100 is indicated. If shut-down of the processor 100 is indicated in block 426, control transfers to block 428 where control returns to a calling process. If shut-down of the processor 100 is not indicated in block 426, control transfers to block 424. In block 408, when the number of bytes associated with the SDO is greater than two bytes, control transfers to block 410. In block 410, the speculative SPD is modified based on the number of bytes associated with the SDO. As noted above, whether the SPD is incremented or decremented is determined by an operation indicator provided by the decoders 106. Next, in block 412, a current location in the stack is determined based on the stack pointer and the SPD. Then, in decision block 414, it is determined whether a pipeline flush is required (i.e., whether a pipeline abort event occurred). If a pipeline flush is required in block 414, control transfers to block 422, where a speculative SPD is replaced with an architectural SPD. Following block 422, control transfers to block 424.

If a pipeline flush is not required in block 414, control transfers to decision block 416, where it determined whether an overflow or an underflow of the SPD register is about to occur. For example, assuming the SPD register is a signed 5-bit register and the SPD register is incremented beyond +15 overflow occurs. Similarly, decrementing the SPD register beyond −16 causes underflow to occur. In this case, control transfers to block 418, where the stack pointer is updated (i.e., a current value of the SPD is added to a current value of the stack pointer, which is then stored in the stack pointer register) and the SPD register is cleared. In block 416 when an overflow or an underflow of the SPD register is not about to occur, control transfers to decision block 420. In block 420 when synchronization of the stack pointer is required, control transfers to block 418. When synchronization of the stack pointer is not required in block 420, control transfers to block 424.

Accordingly, techniques have been disclosed herein that utilize a stack pointer delta in combination with a stack pointer to avoid the use of frequent stack pointer adjustment operations for stack dependent operations. Removing a dependency of a stack dependent operation on a stack pointer value stored in a stack pointer register usually improves latency, reduces power consumption, and increases performance of a related processor, as the processor is not required to serially access a stack pointer register for each stack dependent instruction.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof

What is claimed is:

1. A method, comprising:
   setting, at a processor, a stack pointer to an initial value for a stack;
   determining, at the processor, a number of bytes associated with a stack dependent operation;
   modifying, at the processor, a speculative stack pointer delta based upon the number of bytes associated with the stack dependent operation;

determining, at the processor, a current location in the stack based on the stack pointer and the speculative stack pointer delta;

in response to retiring the stack dependent operation, updating an architectural stack pointer delta based on the speculative stack pointer delta; and in response to determining a pipeline flush is indicated, modifying the speculative stack pointer delta based on the architectural stack pointer delta.

2. The method of claim 1, further comprising:

updating the stack pointer with a current stack pointer value prior to an overflow or an underflow of the speculative stack pointer delta, wherein the current stack pointer value is equal to a sum of a current value of the speculative stack pointer delta and a current value of the stack pointer; and clearing the speculative stack pointer delta after the updating.

3. The method of claim 1, wherein modifying the speculative stack pointer delta based on the number of bytes further comprises:

incrementing or decrementing the speculative stack pointer delta based upon the number of bytes associated with the stack dependent operation.

4. The method of claim 1, wherein the stack dependent operation is associated with a push instruction, a pop instruction, a call instruction, or a return instruction.

5. The method of claim 1, wherein the stack dependent operation is associated with a stack dependent load instruction or a stack dependent store instruction and the method further comprises:

providing a value of the speculative stack pointer delta and a value of the stack pointer as sources for the stack dependent operation.

6. The method of claim 1, wherein the determining the current location further comprises:

determining the current location in the stack without employing a stack pointer adjustment operation.

7. The method of claim 1, wherein the stack dependent operation is not associated with a stack dependent load instruction or a stack dependent store instruction and the method further comprises:

updating the stack pointer with a current stack pointer value, wherein the current stack pointer value is equal to a sum of a current value of the speculative stack pointer delta and a current value of the stack pointer; and clearing the speculative stack pointer delta after the updating.

8. The method of claim 1, wherein modifying the speculative stack pointer delta based on the architectural stack pointer delta comprises:

replacing the speculative stack pointer delta with the architectural stack pointer delta.

9. The method of claim 1, wherein the determining the number of bytes further comprises:

determining whether the stack dependent operation is a 64-bit operation or a 32-bit operation.

10. A processor, comprising:

a decoder configured to decode a stack dependent instruction to a respective stack dependent operation, wherein the decoder is further configured to provide a first indicator that indicates a number of bytes associated with the stack dependent operation; and a sideband stack optimizer coupled to the decoder, the sideband stack optimizer comprising:

a speculative stack pointer delta register configured to store a speculative stack pointer delta;

an architectural stack pointer delta register configured to store an architectural stack pointer delta; and logic configured to update the speculative stack pointer delta based on the first indicator, wherein the speculative stack pointer delta is combined with a stack pointer stored in a stack pointer register to provide a current stack pointer, the logic further configured to modify the architectural stack pointer delta based on the speculative stack pointer delta in response to determining retirement of the stack dependent instruction, and configured to modify the speculative stack pointer delta based on the architectural stack pointer delta in response to determining a pipeline flush is indicated.

11. The processor of claim 10, wherein the decoder is further configured to provide a second indicator for the stack dependent operation that indicates whether an add or subtract operation is to be performed on the speculative stack pointer delta.

12. The processor of claim 10, wherein the speculative stack pointer delta is updated based upon the number of bytes associated with the stack dependent operation.

13. The processor of claim 10, wherein the stack dependent operation is associated with a push instruction, a pop instruction, a call instruction, or a return instruction.

14. The processor of claim 10, further comprising:

a re-order buffer configured to store the stack dependent operation.

15. The processor of claim 10, wherein the processor is further configured to update a stack pointer with a current stack pointer value which is equal to a sum of a current value of the speculative stack pointer delta and a current value of the stack pointer and clear the speculative stack pointer delta after the update.

16. The processor of claim 10, wherein the logic is configured to replace the speculative stack pointer delta with the architectural stack pointer delta in response to determining a pipeline flush is indicated.

17. The processor of claim 10, wherein the decoder is further configured to determine whether the stack dependent operation is a 64-bit operation or a 32-bit operation.

18. The processor of claim 17, wherein the decoder is further configured to provide a stack pointer adjustment operation when the stack dependent operation is a 16-bit operation.

19. A system, comprising:

a processor, comprising:

a decoder configured to decode a stack dependent instruction to a stack dependent operation, wherein the decoder is further configured to provide an indicator that indicates a number of bytes associated with the stack dependent operation; and a sideband stack optimizer coupled to the decoder, the sideband stack optimizer comprising:

a speculative stack pointer delta register configured to store a speculative stack pointer delta;

an architectural stack pointer delta register configured to store an architectural stack pointer delta; and logic configured to update the stack pointer delta based on the indicator, wherein the speculative stack pointer delta is added to a stack pointer stored in a stack pointer register to provide a current stack pointer, the logic further configured to modify the architectural stack pointer delta based on the speculative stack pointer delta in response to determining retirement of the stack dependent instruction, and configured to modify the speculative stack pointer delta based on the architectural stack pointer delta in response to determining a pipeline flush is indicated; and a memory subsystem coupled to the processor, wherein at least a portion of the memory subsystem is configured to provide a stack.

20. The system of claim 19, wherein the decoder is further configured to determine whether the stack dependent operation is a 64-bit operation or a 32-bit operation that does not require an associated stack pointer adjustment operation or a 16-bit operation that requires the associated stack pointer adjustment operation.

* * * * *